Jan. 16, 1962 G. E. HAGEN 3,017,074
INTERCOUPLING APPARATUS
Filed March 26, 1956 5 Sheets-Sheet 1
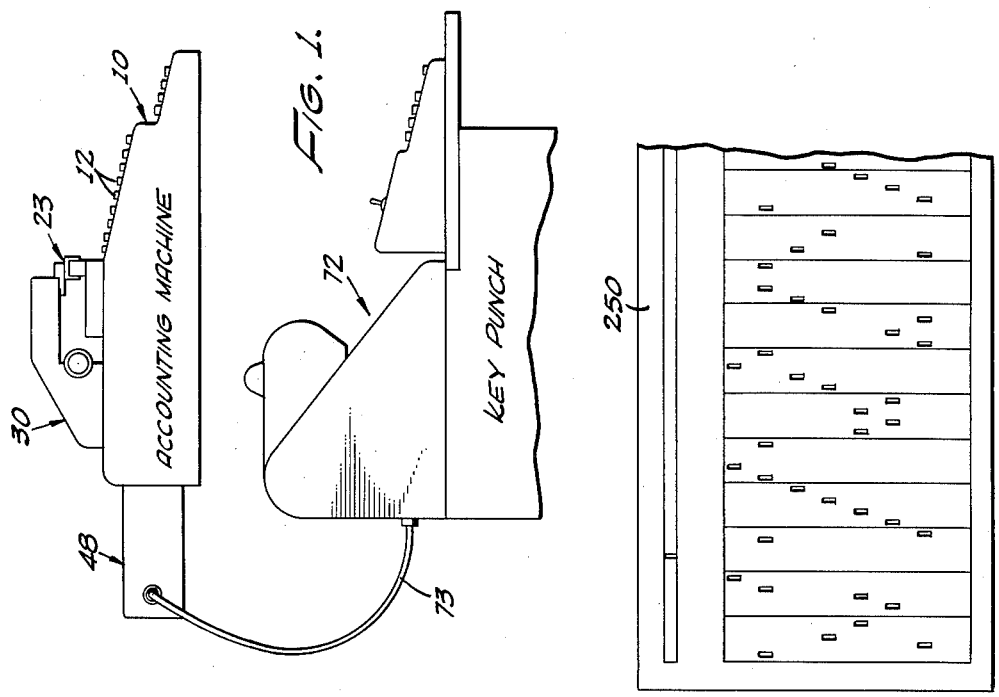
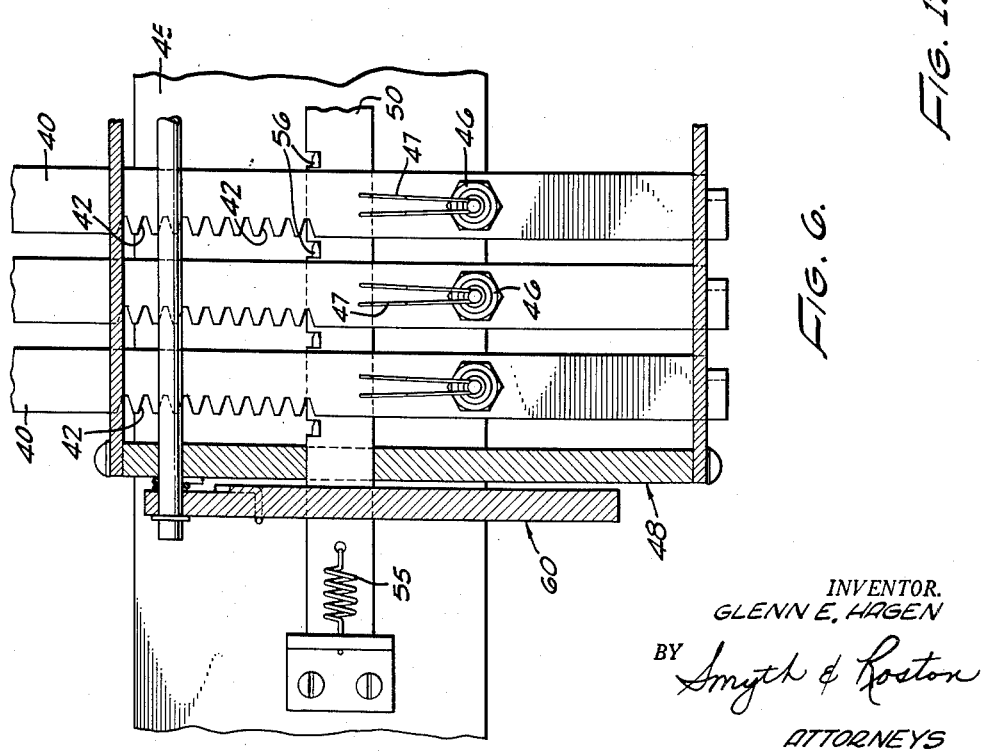
INVENTOR.
GLENN E. HAGEN
BY Smyth & Roston
ATTORNEYS

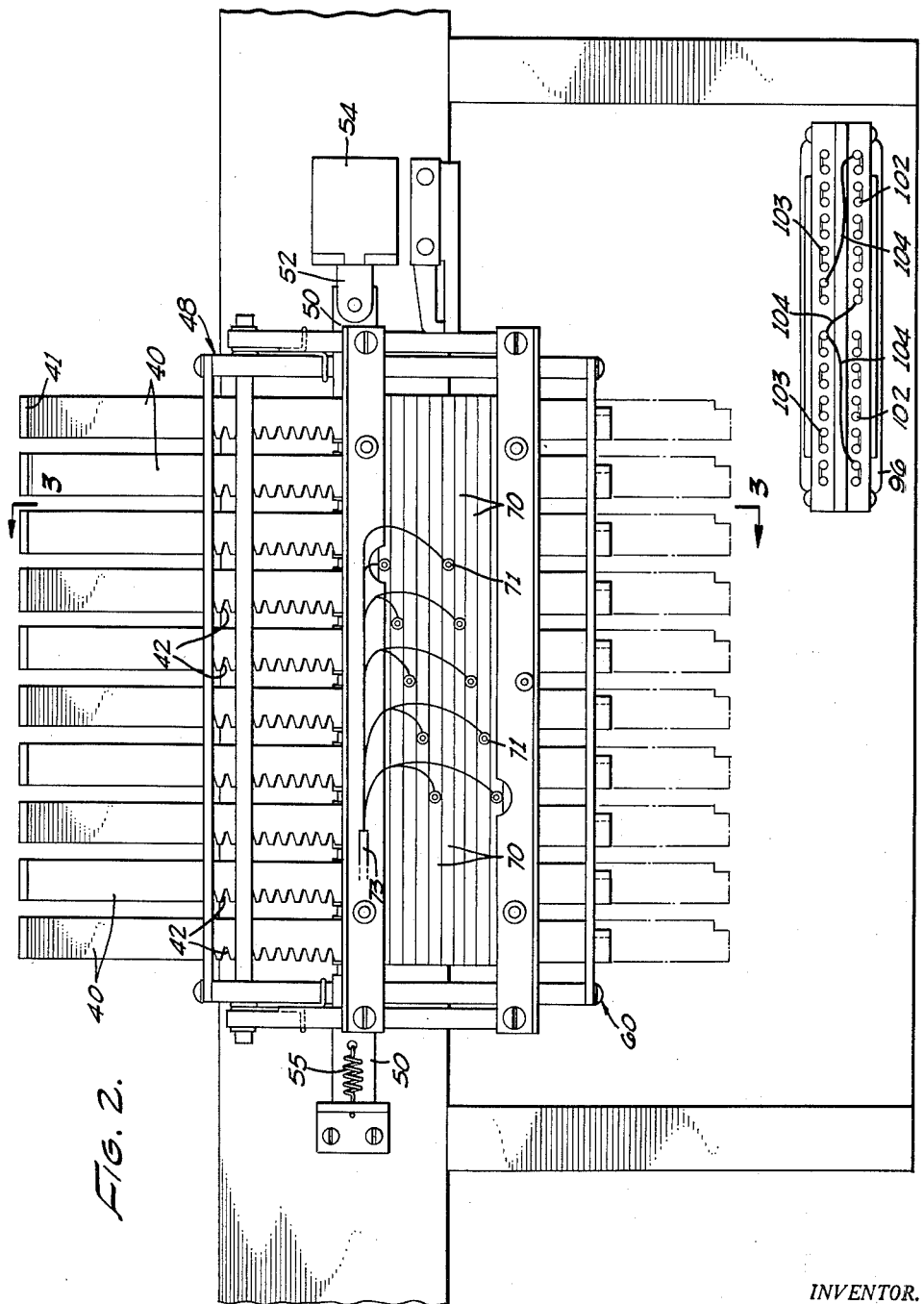

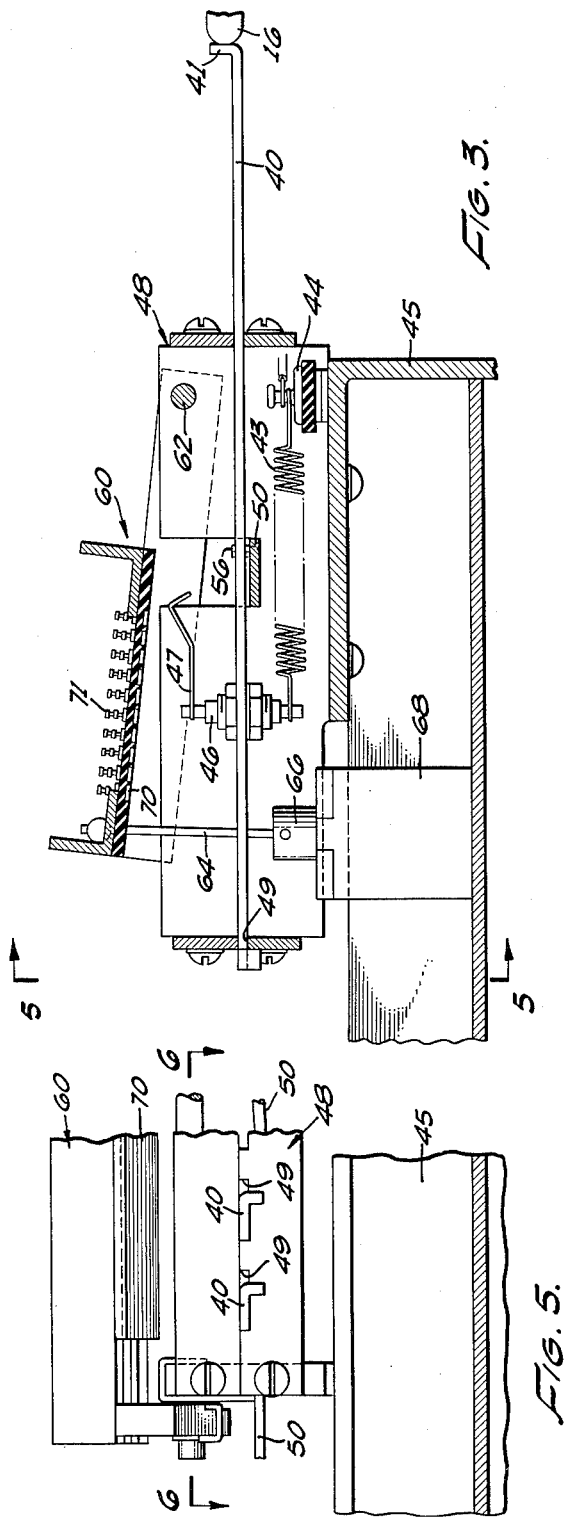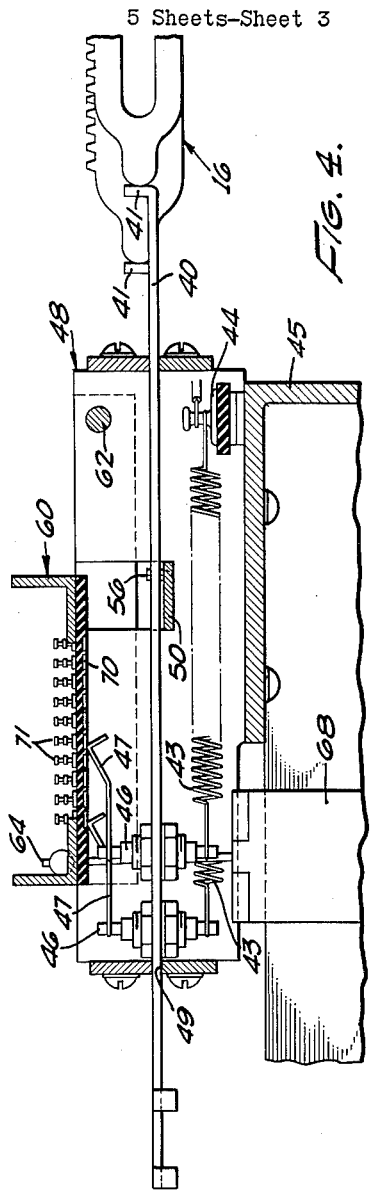

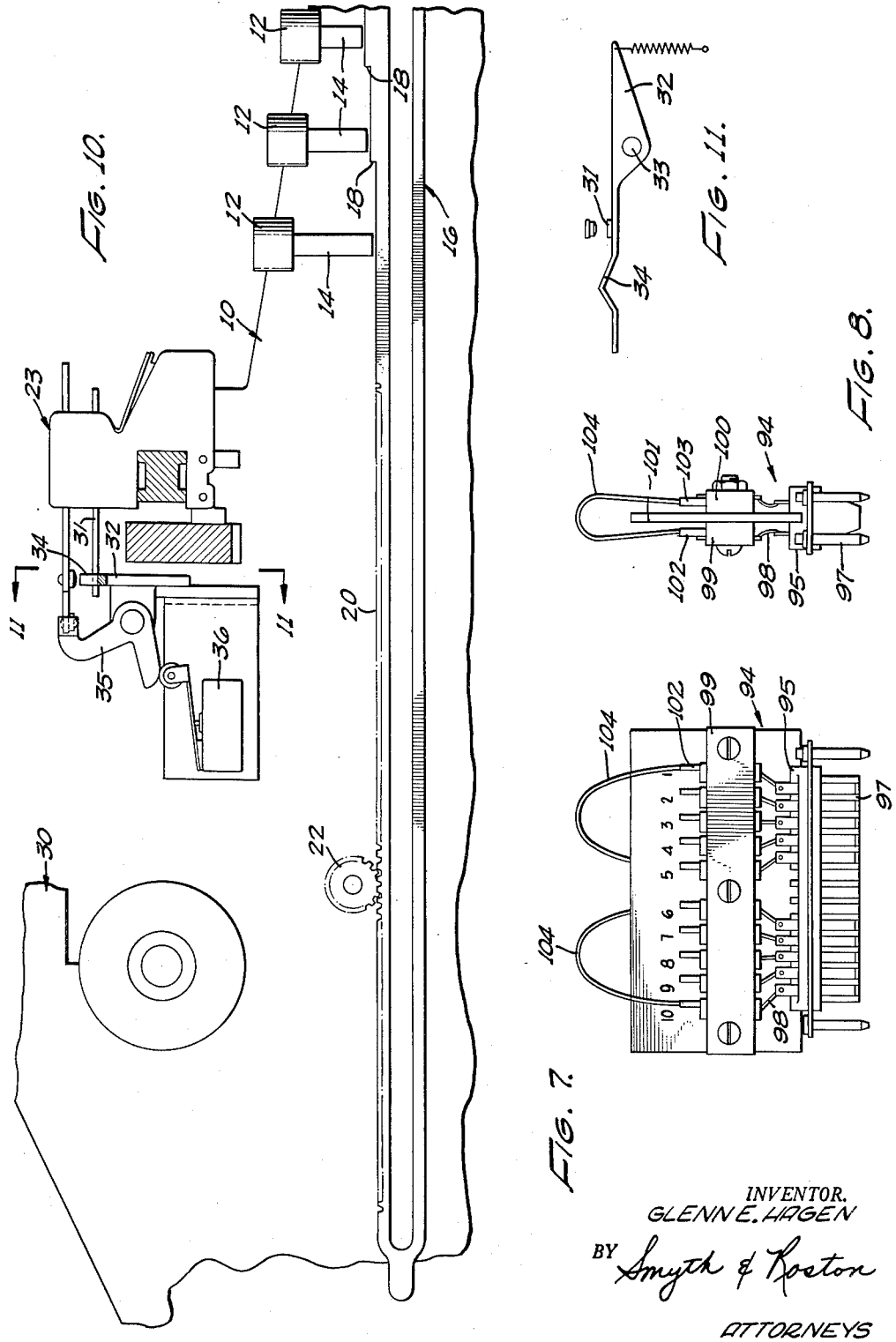

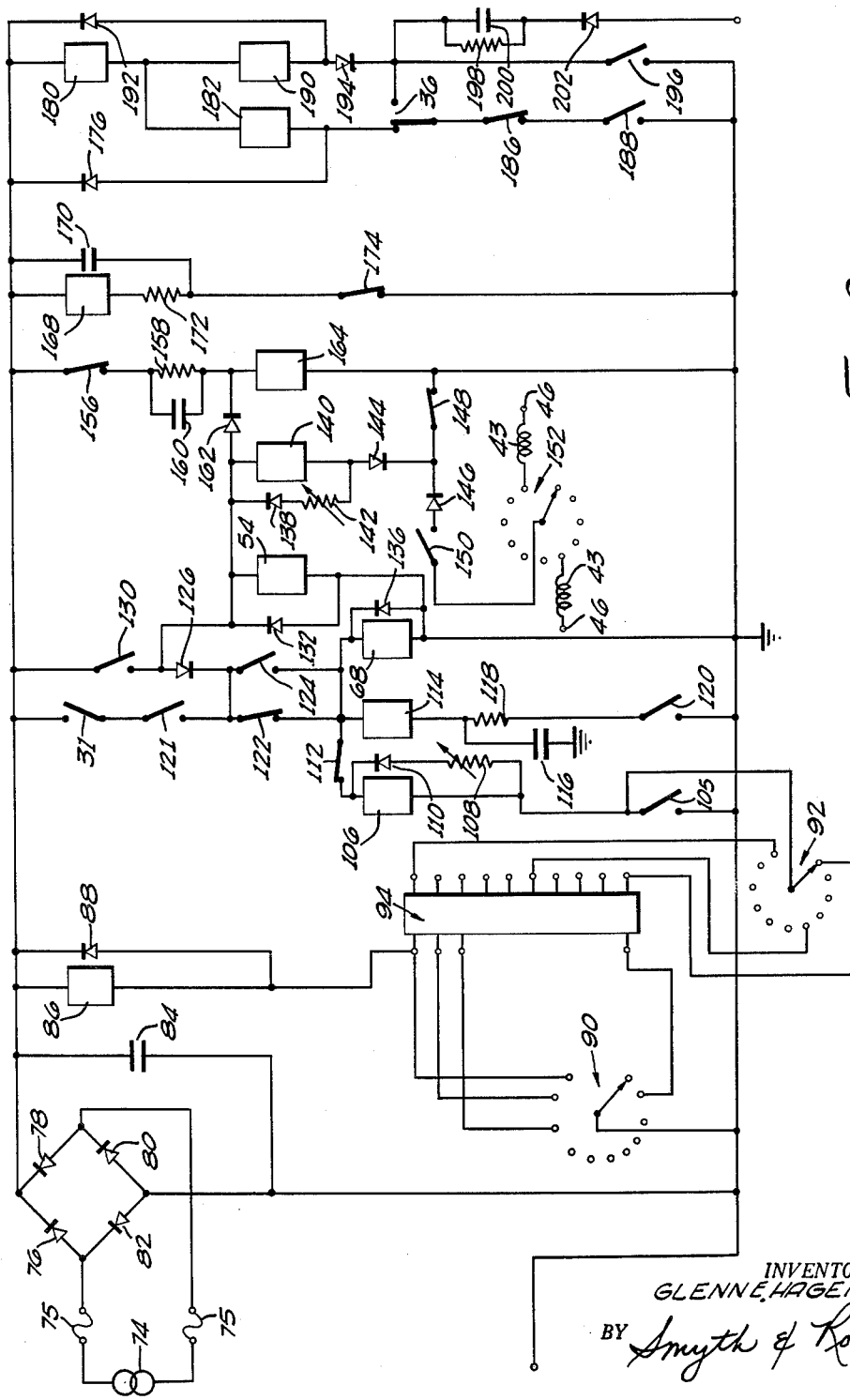

United States Patent Office 3,017,074
Patented Jan. 16, 1962

3,017,074
INTERCOUPLING APPARATUS
Glenn E. Hagen, Hermosa Beach, Calif., assignor, by mesne assignments, to General Instrument Corporation, Hawthorne, Calif., a corporation of New Jersey
Filed Mar. 26, 1956, Ser. No. 573,719
25 Claims. (Cl. 234—23)

This invention relates to coupling apparatus and more particularly to apparatus for coupling equipment such as accounting machines to card punching equipment to punch cards in accordance with the information from the accounting machines.

In recent years, a considerable amount of effort has been made to mechanize office work. For example, various types of accounting machines have been built to minimize the amount of manual work that has to be done in an office. The attempts to mechanize office work have been aided considerably by the use of electronic techniques in building data processing systems. These data processing systems have been used to control the business of large organizations such as banks and department stores. The business of these large organizations has been controlled even though millions of bits of information sometimes have to be processed.

As in many types of businesses, several companies manufacture and sell competing equipment. Sometimes these equipments perform complementary functions and at other times the equipments of the competing companies perform different functions. Since the equipments manufactured by different companies sometimes perform different functions, it would be desirable to couple one type of equipment manufactured by a first company and another type of equipment manufactured by a second company to obtain automatically results which could otherwise be obtained only by the efforts of much manual labor even with the equipment of the two companies. Various attempts have been made to couple the equipments of different companies so that the amount of manual labor required could be minimized. However, these attempts have not been entirely successful.

This invention provides apparatus for coupling certain accounting machines to a key punch to perform automatically particular functions which could only be performed by the use of considerable manual labor such as two operators. By using the coupling apparatus constituting this invention, the information obtained from the accounting machine is introduced to the key punch to record information in coded form on a plurality of cards. The information is recorded automatically at the key punch so that the need for an operator at the key punch is eliminated.

The apparatus constituting this invention includes a control panel for dividing the information cards into fields and into a particular number of columns in each field. The apparatus includes a first switch which is sequentially stepped to indicate the particular column being presented for operation at any instant. A second stepping switch is associated with the first stepping switch to indicate the particular field being operated upon at any instant. The second stepping switch is associated with the first stepping switch to become advanced upon each occurrence of a full count in the first stepping switch. When a particular count of the columns has been reached in the field undergoing computation, control panel cooperates with the stepping switches to produce a control signal.

A plurality of racks are associated with the accounting machine for movable disposition in accordance with the information from the accounting machine. The racks are associated with a commutator having a plurality of electrical lines. After the racks have been moved into position by the accounting machine, the commutator becomes pivoted into coupled relationship with the racks so that the racks energize different information lines in the commutator. Output signals pass through the energized information lines to the key punch upon the occurrence of the control signal produced by the control panel and the first and second switches. These output signals cause the key punch to record on the cards information related to the lines energized in the commutator. The information coded on the cards can then be used in data processing systems to perform calculations relating to mathematical or business problems.

In the drawings:
FIGURE 1 is an elevational view somewhat schematically illustrating the relationship between an accounting machine, a key punch and an intercoupler constituting this invention for feeding information from the accounting machine to the key punch;

FIGURE 2 is a plan view of the intercoupler constituting this invention in the position where no information has been introduced from the accounting machine to the intercoupler for passage to the key punch;

FIGURE 3 is a sectional view substantially on the line 3—3 of FIGURE 2 and illustrates the construction of the intercoupler in further detail and the disposition of various members in the intercoupler when no information has been introduced to the intercoupler from the accounting machine;

FIGURE 4 is a sectional view similar to that shown in FIGURE 3 and illustrates the disposition of various members in the intercoupler after information has been introduced to the intercoupler for passage to the key punch;

FIGURE 5 is a fragmentary sectional view substantially on the line 5—5 of FIGURE 3 and illustrates in further detail certain features included in the intercoupler;

FIGURE 6 is an enlarged fragmentary sectional view substantially on the line 6—6 of FIGURE 5 and illustrates the relationship of various members in the intercoupler when no information has been introduced by the accounting machine to the intercoupler for transfer to the key punch;

FIGURE 7 is a front elevational view of a sub-assembly forming a part of the intercoupler shown in the previous views and illustrates the manner in which connections are made in the sub-assembly;

FIGURE 8 is a side elevational view of the sub-assembly shown in FIGURE 7 and illustrates in further detail the manner in which connections are made in the sub-assembly;

FIGURE 9 is a circuit diagram somewhat schematically illustrating the electrical features of the intercoupler and includes certain members shown in the previous figures;

FIGURE 10 is an enlarged side elevational view, partly in section, illustrating certain features in the accounting machine which control the particular information transferred to the intercoupler shown in FIGURES 1 to 9, inclusive;

FIGURE 11 is an enlarged fragmentary sectional view substantially on the line 11—11 of FIGURE 10 and illustrates in further detail the construction of certain features in the accounting machine; and FIGURE 12 is an enlarged fragmentary view of a card on which information is punched by the key punch in accordance with the transfer of information from the accounting machine to the intercoupler.

The embodiment of the invention shown in the drawings is adapted to be used for coupling an accounting machine manufactured by the National Cash Register Company to a key punch manufactured by the International Business Machines Company. The particular type of machine manufactured by the National Cash Register Company may be designated as a Class 31 or Class 32. The particular key punch manufactured by the International Business Machines Company may be designated as Types "024," "016," "026" and "031." The construction and operation of a suitable key punch for use in conjunction with applicant's intercoupling apparatus are fully set forth in Patent 2,684,719 issued on August 19, 1950.

Since the accounting machine and the key punch are conventional pieces of equipment, their construction and operation are known by persons skilled in the art. For this reason, only a schematic representation of certain important features in the accounting machine and in the key punch is shown in the drawings. Furthermore, the construction and operation of these important features is discussed only on a limited basis and only for the purpose of providing a background as to the operation of the intercoupler constituting this invention.

The accounting machine coupled to the apparatus constituting this invention includes a keyboard such as that shown in FIGURE 1. The keyboard has a plurality of rows each of which has a plurality of keys. For example, nine keys may be included in each row and each key may be provided with a successive digit from "1" to "9," inclusive. The accounting machine is generally indicated at 10 and the keys are indicated at 12. The accounting machine shown in the drawings and described in the specification may be constructed in a manner similar to that fully described and shown in Christian et al. Patent No. 2,626,749. As will be seen in FIGURE 1 of the Christian patent, a plurality of keys may be disposed in different rows such that the different keys in each row are numbered from "1" to "9," inclusive. Although the accounting machine disclosed by Christian et al. is specifically used as a reference, it should be appreciated that any other type of accounting machine can also be used.

Rods 14 extend downwardly in FIGURE 10 from the keys 12 to positions contiguous to racks 16. Springs (not shown) are attached at one end to the racks 16 and at the other end to the frame of the accounting machine to return the racks to a zero position after any movements of the racks. Each of the racks 16 is associated with a different column of keys 12. The racks 16 have lugs 18 which are adapted to engage the rods 14 after movements of the racks through particular distances. The lugs 18 are separated from the associated rods 14 by distances related to the number on the keys. For example, the rod 14 which extends downwardly from the key 12 having the number "1" may be separated from its associated lug 18 by a first distance. The distance between the next rod 14 and the next lug 18 may be approximately twice as great as the first distance to represent the digit "2." The particular arrangement of the keys 12, the rods 14, the racks 16 and the lugs 18 is shown in FIGURE 3a of Christian Patent 2,626,749 and is fully disclosed in columns 25 and 26 of the specification in that patent. As will be seen in the Christian patent, actuators 617 are provided with shoulders 618 to receive studs 605 in the Christian patent. This corresponds to the particular arrangement shown in FIGURE 10 of applicant's drawings and described in the specification of this application.

At the rear end, the racks 16 are provided with teeth 20 which are adapted to mesh with pinions 22. The racks 16 are adapted to mesh with the pinions 22 only at particular times dependent upon the coding provided in a control bar 23 which forms a part of the accounting machine. When the pinions 22 mesh with the racks 16, the pinions control the movements of the racks rather than the lugs 18 and the depressed rods 14. The pinions 22 correspond to similar members 997 shown in FIGURE 3b of Christian Patent 2,626,749 and described in columns 38 and 39 of that patent. As will be seen in the Christian patent, each totalizer uses a wheel having a plurality of teeth. Lines 9 to 15, inclusive, of column 39 in the Christian patent indicate that the wheels 997 drive the auxiliary actuators 907 which are similar to the actuators 617. As previously described, the actuators 617 correspond to the racks 16 shown in FIGURE 10 of this application.

The accounting machine also has a carriage 30 which is movable laterally with respect to the control bar 23 and the frame of the machine. The carriage 30 is movable at any instant only through distances which do not represent the complete range of travel of the carriage. The distance of movement of the carriage 30 is dependent upon the type of operation being performed by the accounting machine. The movement of the carriage 30 laterally with respect to the control bar 23 is dependent upon the positioning of switches 31 (FIGURE 11). The movable contacts of the switches 31 are disposed in the path of a finger 32 pivotable as at 33. The finger 32 has a hooked portion 34 for controlling the movements of the movable contacts of the switches 31 into engagement with the stationary contacts of the switches as the finger moves along the cross bar 23. The carriage 30 also carries an arm 35 which is adapted to engage the movable contact of a single-pole, double-throw switch 36. The movable contact of the switch 36 is disposed on the frame of the accounting machine at such a position as to become engaged by the arm 35 after the carriage 30 has completed its movement laterally with respect to the frame of the machine. The movable contact of the switch 36 is normally disposed in engagement with one stationary contact of the switch 36. The movable contact of the switch 36 is pivotable into engagement with the other stationary contact of the switch upon becoming actuated by the arm 35. The switch 36 may be of a type designated by the trade name of "Microswitch" by the Minneapolis-Honeywell Company. The carriage 30 shown in FIGURE 10 of applicant's drawings and described above in applicant's specification corresponds to the carriage shown in FIGURES 1, 70 and 79 and described in column 55 of Christian Patent 2,626,749. The switches 31 and the fingers 32 correspond to members shown in FIGURES 99 to 103 inclusive, and described in columns 86 and 87 of the Christian patent. For example, in lines 8 to 22, inclusive, of column 87 in the Christian patent, sensing members 1890 are pivotably disposed and are urged in a particular angular direction by springs 1906 so as to move sensing fingers 1889 into engagement with plates 1405. The sensing fingers 1889, the plates 1405 and the springs 1906 correspond to the members shown in FIGURE 11 of applicant's drawings. Lines 27 to 37, inclusive, of column 88 in the Christian patent further indicate the sensing action provided by the sensing fingers 1889 and the movement of the fingers into engagement with the plates 1405.

The coupling apparatus constituting this invention is shown electrically in FIGURE 9 and is illustrated from a mechanical standpoint in FIGURES 1 to 8, inclusive. The apparatus includes a plurality of racks 40 disposed in contiguous relationship to the racks 16 in the accounting machine. The racks 40 are provided with lip portions 41 (FIGURES 3 and 4) which are adapted to be contacted by the rear ends of the racks 16. The racks 40 are so disposed relative to the racks 16 as to be driven through a horizontal distance dependent upon the movements of the racks 16. Each of the racks 40 is associated with a different one of the racks 16.

Each of the racks 40 has a plurality of teeth 42 disposed along one edge of the rack. For example, each of the racks 40 may have ten teeth 42 (FIGURES 2 and 6) to correspond to the different digits between "0" and "9," inclusive. A coiled spring 43 (FIGURES 3 and 4) is attached at one end to each of the racks 40 at a position below the racks. The coiled springs 43 are attached at their other ends to terminals 44 suitably supported on a chassis member 45. As will be described in detail subsequently, the coiled springs 43 operate not only to return the racks 40 to their zero position, but also to provide electrical continuity to ground for other members in the intercoupler constituting this invention. The coiled springs 43 provide electrical continuity to ground for these members only at particular times, as will be described in detail subsequently.

Each of the racks 40 carries on its upper face an electrical terminal 46 which serves to fixedly position a pair of resilient whiskers 47. The whiskers 47 may be made from a suitable conductive material having good properties of wear and resilience such as platinum or plutonium. The whiskers 47 extend forwardly and upwardly along the racks 40 to provide electrical connections in a manner which will be described in detail subsequently. Pairs of whiskers 47 are provided to insure good electrical contact with other members hereinafter to be described in detail.

The racks 40 are positioned within a frame 48 (FIGURES 2, 5 and 6) and are slidable forwardly and rearwardly through holes 49 (FIGURE 5) at the rear end of the frame. A cross bar 50 is also supported by the frame at a position below the racks 40 and is disposed horizontally in a direction substantially perpendicular to the disposition of the racks 40. The cross bar 50 is coupled to an armature 52 which is magnetically associated with a solenoid 54. The armature 52 is coupled to the cross bar 50 so as to produce a sliding movement of the cross bar in a lateral direction when the solenoid is energized. The cross bar 50 is movable by the armature 52 against the action of a spring 55.

Lugs 56 (FIGURE 6) extend upwardly from the cross bar 50 at spaced intervals along the length of the cross bar. The lugs 56 are provided with configurations to fit into the teeth 42 in the racks 40 when the cross bar 50 is slid laterally toward the right in FIGURES 2 and 6 upon the actuation of the armature 52.

A commutator 60 (FIGURES 2, 3 and 4) made from a material having suitable properties of electrical insulation such as a spun glass laminate is positioned above the racks 40 and the cross bar 50. As may be best seen in FIGURE 3, the commutator 60 is normally disposed at an oblique angle with respect to the racks 40 and is pivotable at one end on a pin 62. An arm 64 extends downwardly from the commutator 60 at the end opposite to the pin 62. The arm 64 is attached to an armature 66. The armature 66 is magnetically associated with a solenoid 68 so as to become actuated when the solenoid is energized.

A plurality of leads 70 extend laterally across the commutator 60 on the bottom face of the commutator. The leads 70 extend in a direction substantially perpendicular to the racks 40. The leads 70 may be made from a suitable material such as platinum having a high conductivity and a high resistance to wear. The leads 70 are parallel to one another and are spaced from one another by distances corresponding to the distance between the teeth on the racks 40. The leads 70 are adapted to contact the whiskers 47 when the commutator 60 is pivoted downwardly. Terminals 71 extend upwardly through the commutator 60 from each of the leads 70 to provide connections for leads running to a key punch generally indicated at 72 in FIGURE 1. The leads extending from the terminals 71 to the key punch 72 may be disposed within a cable 73 in FIGURES 1 and 2.

The whiskers 47 and the leads 70 are included in the electrical circuitry. Certain of this electrical circuitry is shown in FIGURE 9. The circuitry shown in FIGURE 9 includes a source 74 of alternating voltage such as that provided from wall outlets. The source 74 is connected through suitable fuses 75 to a bridge circuit formed from a plurality of unidirectional members such as diodes 76, 78, 80 and 82. The plate of the diode 76 and the cathode of the diode 82 are connected to one terminal of the source 74. Similarly, the plate of the diode 78 and the cathode of the diode 80 are connected to the other terminal of the source 74.

A storage capacitance 84 has a common connection at one terminal with the cathodes of the diodes 76 and 78 and at the other terminal has a common connection to ground with the plates of the diodes 80 and 82. One terminal of a relay 86 and the cathode of a diode 88 also have a common connection with the cathodes of the diodes 76 and 78. The plate of the diode 88 is connected to the other terminal of the relay 86 and to the last stationary contact in a stepping switch generally indicated at 90.

The stepping switch 90 may be obtained from the C. P. Clare Company and is designated by that company as a Type DS-12. It has a movable contact and a plurality of stationary contacts. For example, eleven stationary contacts may be provided in the stepping switch 90. The first stationary contact in the switch 90 is included to insure the proper operation of the various members, as will be described in detail subsequently. The other ten stationary contacts are included in the switch, to correspond with the digits from "0" to "9," inclusive.

The movable contact of the switch 90 is adapted to sequentially engage the successive stationary contacts of the switch 90 upon successive actuations of a relay, as will be described in detail subsequently. Means are included in the relay for returning the movable contact of the switch 90 from the last stationary contact of the switch to the first stationary contact of the switch every time that the movable contact reaches the last stationary contact.

A stepping switch generally indicated at 92 is associated with the switch 90. The stepping switch 92 may have a construction corresponding to that of the switch 90. This may include a movable contact and a plurality of stationary contacts such as 10 stationary contacts to correspond with the digits from "0" to "9," inclusive.

A panel board generally indicated at 94 is associated with the switches 90 and 92. The panel board 94 is provided with a male receptacle 95 (FIGURES 7 and 8) adapted to be inserted into a female receptacle 96 (FIGURE 2) mounted on the frame 45. Terminals 97 are provided on each side of the male receptacle 95 and the female receptacle 96 to provide electrical connections. Leads 98 extend from the terminals of the male receptacle 95 to a pair of connector boards 99 and 100 made from a suitable insulating material. The connector boards 99 and 100 are disposed on opposite sides of a separator 101 made from a suitable insulating material.

A plurality of hollow conductive pins 102 extend upwardly at spaced intervals from the top of the connector board 99. Adjacent pairs of pins 102 may be electrically connected to each other so that ten pairs of pins are obtained to correspond to the decimal digits from "0" to "9," inclusive. In like manner, a plurality of hollow conductive pins 103 are disposed at spaced intervals on the connector board 100 and are electrically coupled into ten pairs corresponding to the decimal digits from "0" to "9," inclusive.

Each of the pins 102 is electrically connected through the male receptacle 95 and the female receptacle 96 to a different one of the stationary contacts in the stepping switch 90. In like manner, each of the pins 103 is electrically connected through the male receptacle 95 and the female receptacle 96 to a different one of the stationary contacts in the stepping switch 92. Leads 104 electrically interconnect the pins 102 and 103. One end of each lead 104 extends into one of the pins 102 and the other end of each lead extends into one of the pins 103. The leads 104 are removable from the pins 102 and 103. Because of this, the leads 104 can be made to interconnect the pins 102 and 103 in any desired pattern. This may be best seen in FIGURES 2 and 7.

The movable contact of the stepping switch 90 (in FIGURE 9) is grounded. The movable contact of the stepping switch 92 is connected to the movable contact of a single-pole, single-throw switch 105, the stationary contact of which is grounded. The movable contact of the stepping switch 92 is also connected to one terminal of a relay 106 and to one stationary contact of a rheostat 108. The other stationary and movable contacts of the rheostat 108 have a common connection with the plate of a diode 110. The cathode of the diode 110 has a common connection with the second terminal of the relay 106.

The relay 106 is magnetically coupled to the movable contact of the switch 105 so as to produce a closure of the switch when the relay is energized. The relay 106 is connected to the stationary contact of a single-pole, single-throw switch 112 magnetically coupled to the relay 86. The movable contact of the switch 112 has a common connection with one terminal of a relay 114. A connection is made from the second terminal of the relay 114 to one terminal of a capacitance 116 having its second terminal grounded and to one terminal of a resistance 118. The movable contact of a switch 120 is connected to the second terminal of the resistance 118, and the stationary contact of the switch is grounded.

A plurality of switches are in series with the switch 112 and the relay 106 to produce a continuous circuit from the cathodes of the diodes 76 and 78 through these members when the switches are closed. These switches include the switches 31 in the accounting machine and a manually operated master switch 121 in the accounting machine. Only one of the switches 31 is shown in FIGURE 9 for purposes of simplicity. The switches also include a single-pole, single-throw switch 122 magnetically coupled to the relay 86 to produce an opening of the switch when the relay becomes energized.

A switch 124 magnetically coupled to the relay 106 is in parallel with the switch 122. The movable contact of the switch 124 is connected to the cathode of a diode 126 having its plate connected to the stationary contact of a single-pole, single-throw switch 130. The movable contact of the switch 130 is adapted to receive voltage from the cathodes of the diodes 76 and 78.

The stationary contact of the switch 130 is connected to the cathode of a diode 132 and to one terminal of the solenoid 54 (also shown in FIGURE 2) as well as to the plate of the diode 126. The second terminal of the solenoid 54 and the plate of the diode 132 are grounded, as are the plate of a diode 136 and one terminal of the solenoid 68 (also shown in FIGURES 3 and 4). The cathode of the diode 136 and the second terminal of the solenoid 68 are connected to the stationary contact of the switch 124.

In addition to the connections described above, the plate of the diode 126 is connected to the cathode of a diode 138 and one terminal of a relay 140. A variable resistance 142, such as a potentiometer, is connected between the plate of the diode 138 and the second terminal of the relay 140. A connection is made to the plate of a diode 144 from the common terminal between the relay 140 and the resistance 142. The cathode of the diode 144 has a common connection with the cathode of a diode 146 and the movable contact of a switch 148.

The plate of the diode 146 and the stationary contact of a switch 150 are provided with a common terminal. The movable contact of the switch 150 is magnetically coupled to the relay 106 to provide a closure of the switch when the relay becomes energized. The movable contact of the switch 150 has a common connection with the movable contact of a stepping switch generally indicated at 152.

The stepping switch 152 is mechanically ganged to the stepping switch 90 and is constructed in a manner similar to that described above for the stepping switch 90. The stationary contacts of the stepping switch 152 are connected electrically to the springs 43 disposed below the racks 40. Each of the stationary contacts on the stepping switch 152 is connected electrically to a different one of the springs 43 for reasons which will be described in detail subsequently. These connections are shown schematically in FIGURE 9.

The movable contact of a single-pole, single-throw switch 156 is adapted to receive voltages from the cathodes of the diodes 76 and 78. A resistance 158 and a capacitance 160 are in parallel and are connected at one terminal to the stationary contact of the switch 156. Connections are made from the second terminals of the resistance 158 and the capacitance 160 to the cathode of a diode 162. The plate of the diode 162 has a common terminal with the relay 140 and the cathode of the diode 138. Connections are also made from the second terminals of the resistance 158 and the capacitance 160 to one terminal of a relay 164. The other terminal of the relay 164 and the stationary contact of the switch 148 are grounded.

A relay 168 has one terminal connected to receive the voltage on the cathodes of the diodes 76 and 78. A capacitance 170 is in parallel with the relay 168. A resistance 172 and a switch 174 are in series between the relay 168 and ground when the switch is closed. The switch 174 is associated with a particular relay designated as the "alphabet field" relay in the key punch 72 so as to become closed when the relay becomes energized. This relay can be further identified as relay "30" in drawing 228001P schematically illustrating the circuit for the Type "024" IBM key punch. The construction and operation of key punches suitable for use in this invention are fully disclosed in Read Patent 1,962,750; Lee Patent 1,976,618; Von Pein Patent 2,217,209 and Johnson Patent 2,684,719. By way of illustration, the relay magnetically coupled to the switch 174 in applicant's specification and drawings may correspond to the magnet 165 shown in FIGURE 9 of the Von Pein patent and described at the bottom of the first column of page 8 in that patent. The switch 174 in applicant's specification and drawings may correspond to the contacts 91 shown in FIGURE 9 of the Von Pein patent and described at the bottom of the first column of page 8 in that patent.

Voltage is applied to the cathode of a diode 176 from the cathodes of the diodes 76 and 78. Voltage is also applied from the cathodes of the diodes 76 and 78 to one terminal of a relay 180. The relay 180 and a relay 182 are in series across the diode 176. The relay 180 is magnetically coupled to the switch 148 to open the switch when the relay becomes energized. The relay 180 is also associated with the stepping switch 90 to provide for a return of the movable contact of the switch from the last stationary contact to the first stationary contact. The relay 182 is magnetically coupled to the stepping switch 92 to advance the stepping switch every time that the relay becomes energized.

The plate of the diode 176 is connected to a first stationary contact of the double-throw, single-pole switch 36 which is included in the accounting machine. The first stationary contact in the switch 36 is the one normally engaged by the movable contact of the switch. The movable contact of the switch 36 is connected to the movable contact of a switch 186 magnetically coupled to the relay 106 to become opened when the relay is energized. A connection is made from the stationary contact of the switch 186 to the movable contact of a switch 188. The switch 188 is magnetically coupled to the relay 86 to produce a closure of the switch when the relay becomes energized. The stationary contact of the switch 188 is grounded.

A relay 190 is in series with the relay 180. The relay 190 is associated with the stepping switch 92 to produce a return of the movable contact in the switch from the last stationary contact to the first stationary contact of the switch. A diode 192 is in parallel with the series branch formed by the relays 180 and 190 such that the cathode of the diode is connected to the relay 180 and the plate of the diode is connected to the relay 190. The plate of a diode 194 is also connected to the relay 190 and the cathode of the diode is connected to the second stationary contact of the switch 36.

The movable contact of a manually operated single-pole, single-throw switch 196 is connected to the cathode of the diode 194 and the stationary contact of the switch is grounded. The cathode of the diode 190 also has a common connection with first terminals of a resistance 198 and a capacitance 200. Connections are made from the second terminals of the resistance 198 and the capacitance 200 to the cathode of a diode 202. The plate of the diode 202 is connected to an appropriate terminal in the key punch. This terminal is designated as "Post 65," in drawing 228001P relating to the Type "024" IBM key punch. As will be described in detail subsequently, cards become rejected when either the switch 196 is closed or the plate of the diode 202 receives a proper potential from the key punch 150. This proper potential is introduced to the plate of the diode 202, for example, when the contacts 150 in Von Pein Patent 2,217,209 become closed. The contacts 150 are shown in FIGURE 9 and described in the middle of the second column on page 8 of the Von Pein patent. In this way, the switch 196 is effectively in parallel with the contacts 150 in the Von Pein patent.

The apparatus described above is adapted to record information on cards 250. The cards 250 may be made from relatively stiff material having dimensions of approximately 3¼ x 7½ inches. The cards 250 may be provided with horizontal rows of information. For example, approximately 80 columns of information may be provided on each card 250. A plurality of numbers may extend vertically in each column to form a plurality of rows. Each column may have numbers in sequence from "0" to "9," inclusive. Corresponding numbers in each column are horizontally aligned with the same number in the other columns. By way of illustration, the number "5" may be disposed at the same position in each column.

The accounting machine 10 described briefly above and shown somewhat schematically in the drawings is adapted to perform different types of operations. For example, the accounting machine is adapted to receive input quantities and to introduce such quantities directly to the output mechanisms of the machine. The quantities are introduced into the machine by depressing certain of the keys 12 on the keyboard. Specifically, one of the keys in each column may be depressed. This causes the rods 14 associated with the keys 12 to become depressed to a position blocking the movements of the associated racks 16. Because of this, the racks 16 are able to move only through distances related to the particular keys depressed.

The accounting machine 10 is also adapted to perform other operations such as adding or subtracting different numbers to obtain different results. The particular types of operations performed by the accounting machine 10 are dependent upon the settings made in the accounting machine. When the accounting machine 10 performs complex operations, the movements of the racks 16 may be controlled by the rotary movements of the pinions 22.

As previously described, the carriage 30 advances at any instant through particular distances along the control bar 23 and the frame of the accounting machine. The particular distances advanced by the carriage 30 are dependent upon the settings in the accounting machine. After the carriage 30 has advanced through the particular distance at any instant, its motion becomes interrupted. Specifically, the distances advanced by the carriage 30 are dependent on the settings of the switches 31. This results from the fact that the movement of the carriage 30 becomes interrupted every time one of the switches 31 becomes closed. The switches 31 become closed as the finger 32 moves with the carriage 30 past the movable contact of the switch.

During the time that the movement of the carriage 30 becomes interrupted, the racks 16 become moved into their proper position to indicate the output quantities. The racks 16 move against the action of springs (not shown), which operate to return the racks to their zero position at the end of each operation. The movements of the racks 16 may be converted to motions of members for typing information relating to such movements. The typed information may then be compared with the coded information recorded in the cards 250 to make certain that information has been properly recorded in the card.

As previously described, the racks 16 are mechanically coupled to the racks 40 to drive the racks 40 through horizontal distances related to their own movements. The racks 40 move against the action of the springs 43, which operate to return the racks to their zero positions after the racks have been released. Since the connectors 46 are attached to the racks, the connectors are moved through distances corresponding to the movements of the racks. Because of this movement, the whiskers 47 contact different ones of the leads 70 on the commutator 60 when the commutator becomes pivoted downwardly by the flow of current through the solenoid 68. This may be best seen in FIGURE 4.

The circuit shown in FIGURE 9 operates to control the transfer of information from the accounting machine 10 to the key punch 72 (FIGURE 1). The circuit shown in FIGURE 9 receives alternating voltage from the source 74. In the positive half cycles of the alternating voltage, current flows through a circuit including the source 74, the diode 76, the capacitance 84 and the diode 80. The current charges the capacitance 84 to a voltage in which the upper plate of the capacitance in FIGURE 9 is more positive than the lower plate of the capacitance. In the negative half cycles of voltage, current flows through a circuit including the source 74, the diode 78, the capacitance 84 and the diode 82. The current flows through the capacitance 84 in the same direction in the negative half cycles as in the positive half cycles so as to produce a positive voltage on the upper plate of the capacitance in FIGURE 9. The lower plate of the capacitance 84 is grounded.

The positive voltage on the upper plate of the capacitance 84 in FIGURE 9 is introduced to the stationary contacts of the switches 31. As previously described, one of the switches 31 becomes closed upon an interruption in the movement of the carriage 30 in the accounting machine 10. Furthermore, the switch 121 becomes manually closed when the accounting machine 30 is placed into operation since the switch in effect serves as a master switch in the accounting machine. Since the switch 122 is normally closed, a continuous circuit is established through the solenoid 68 when the switches 31 and 121 become closed. This circuit includes the capacitance 84, one of the switches 31, the switch 121, the switch 122 and the solenoid 68.

Upon a flow of current through the solenoid 68, the solenoid becomes energized and actuates the movable contact of the switch 130 into engagement with the stationary contact of the switch. This causes a holding circuit to be established through the solenoid 68. The holding circuit includes the capacitance 84, the switch 130, the diode 126, the switch 122 and the solenoid 68. When the solenoid 68 becomes energized, it actuates the armature 66 (FIGURE 3). The armature 66 in turn pulls the arm 64 downwardly in FIGURE 3 and the arm acts upon the commutator 60 to pivot the commutator in a counterclockwise direction on the pin 62. Upon the occurrence of such a pivotal movement, the leads 70 on the commutator 60 engage the resilient whiskers 47 extending from the racks 40. The particular leads 70 engaging the whiskers 47 are dependent upon the displacements of the racks 40.

The closure of the switch 130 also causes a continuous circuit to be established which includes the capacitance 84, the switch 130 and the solenoid 54. The current is able to flow through the solenoid 54 only after the switch 130 has been closed. The reason for this is that the diode 126 prevents any current from flowing through a circuit including the switches 31 and 120, the diode 126 and the solenoid 54.

The flow of current through the solenoid 54 causes the cross bar 50 to be actuated toward the right in FIGURE 2. When the cross bar 50 is actuated by the solenoid 54, it moves into a position in which the lugs 56 in the cross bar engage the teeth 42 in the racks 40. This may be best seen in FIGURE 6. By providing an engagement between the teeth 42 in the racks 40 and the lugs 56 in the cross bar 50, the racks 40 are prevented from moving during the time that the information represented by the displacement of the racks is being punched. In this way, the information represented by the displacement of the racks 40 is able to be accurately recorded on the cards 250 in a manner which will be described in detail subsequently.

The closure of the switch 130 not only causes current to flow through the solenoids 54 and 68 but also through the relay 164. The flow of current through the relay 164 takes place through a circuit including the capacitance 84, the switch 130, the diode 162 and the relay 164. The diode 162 is included in the circuit to prevent the flow of current through a circuit including the switch 156 and the relay 54 or a circuit including the switch 156 and the solenoid 140 when the switch is closed.

Upon a flow of current through the relay 164, members in the accounting machine 10 are actuated for preventing the motor in the accounting machine from driving the carriage 30 along the cross bar 23. For example, the relay 164 may actually be a solenoid for decoupling a clutch to prevent the motor in the accounting machine from driving the carriage 30 along the cross bar 23. The solenoid may also actuate a finger for engaging a detent to lock the motor against movement. Any other suitable type of apparatus may also be used. This is important in insuring that the information in each interrupted position of the carriage 30 is made available to the key punch through the intercoupler constituting this invention.

Since the switch 148 is normally closed, a continuous circuit is established through the relay 140 when the switch 130 becomes closed. This continuous circuit includes the capacitance 84, the switch 130, the relay 140, the diode 144 and the switch 148. This causes the relay 140 to become energized and to actuate the movable contact of the switch 120 into engagement with the stationary contact of the switch.

Upon a closure of the switch 120, a continuous circuit is established which includes the capacitance 84, the switch 130, the diode 126, the switch 122, the relay 114, the resistance 118 and the switch 120. The relay 114 becomes energized by the flow of current through this circuit and acts upon the switch 148 to open the switch. When the switch 148 becomes opened, the continuous circuit through the relay 140 becomes interrrupted and the relay becomes de-energized. This in turn causes the switch 120 to open and the continuous circuit through the relay 114 to become interrupted. By interrupting the continuous circuit through the relay 114, the relay exerts no force on the switch 148 such that the switch becomes closed.

The closure of the switch 148 causes the continuous circuit through the relay 140 to be re-established. This in turn causes the switch 120 to become closed and the continuous circuit through the relay 114 to become re-established. Upon the flow of current through the relay 114, the switch 148 becomes opened and the flow of current through the relay 140 becomes opened. In this way, the relays 114 and 140 cooperate to provide for an alternate flow of curent through each relay and a simultaneous interruption in the flow of current through the other relay.

The frequency for alternately energizing and de-energizing the relay 114 is dependent in part upon the value of the capacitance 116 and in part upon the value of the resistance 118. This results from the fact that current flows through a circuit including the capacitance 84, the switch 130, the diode 126, the switch 122, the relay 114 and the capacitance 116 during the time that the switch 122 remains closed and the switch 120 is open. The flow of current through this circuit is insufficient to energize the relay 114 but is sufficient to charge the capacitance 116. The capacitance 116 then discharges through a circuit including the capacitance, the resistance 118 and the switch 120, when the switch becomes closed. The discharge of the capacitance 116 through the switch 120 tends to delay the opening of the switch until the capacitance has become almost completely discharged. By delaying the opening of the switch 120, the interruption of the current through the relay 114 becomes delayed and the opening of the switch 148 becomes delayed. This tends to slow the alternate responses of the relays 114 and 140.

The speed of response of the relay 140 is also dependent in part upon the value of the resistance 142. This results from the fact that energy accumulates in the relay 140 because of the inductance in the relay during the time that current flows through the relay. When the switch 148 opens, this energy tends to become dissipated by a flow of current through a circuit including the relay 140, the resistance 142 and the diode 138. During the time that current is flowing through this circuit, the relay 140 remains energized such that the switch 120 is actuated into a position of closure. In this way, the time for response of the relays 114 and 140 can be varied by adjusting the value of the resistance 142.

The diode 138 is included in the circuit with the relay 140 and the resistance 142 to provide for a flow of current through the resistance 142 only during the time that the energy in the relay 140 is being dissipated. This prevents the resistance 142 from serving as a by-pass during the time that the relay 140 is being energized by a flow of current from the capacitance 84.

Every time that the relay 114 becomes energized, it acts upon the movable contact of the stepping switch 90 to advance the movable contact to the next stationary contact. The movable contact of the stepping switch 90 advances in a clockwise direction in FIGURE 9. The movable contact of the stepping switch 152 also advances in a clockwise direction with the movable contact of the stepping switch 90 since the two switches are ganged. When the movable contact of the stepping switch 90 reaches the last stationary contact of the switch, a continuous circuit is established which includes the capacitance 84, the relay 86, the last stationary contact of the stepping switch 90 and the movable contact of the stepping switch. This causes the relay 86 to become energized.

Upon becoming energized, the relay 86 actuates the switch 122 so as to open the switch. This prevents a continuous circuit from being established through the relay 114. Since the relay 114 cannot be energized, the movable contact of the stepping switch 90 cannot be actuated to a postion beyond the last stationary contact of the switch. When energized, the relay 86 also acts upon the movable contact of the switch 188 to close the switch. This causes a continuous circuit to be established which includes the capacitance 86, the relay 180, the relay 182, the left stationary contact and the movable contact of the switch 36, the switch 186 and the switch 188. As previously described, the movable contact of the switch 36 normally engages the left stationary contact of the switch except when the carriage 30 in the accounting machine 10 has completed its travel along the cross bar 23.

Current flows through the relays 180 and 182 during the time that a continuous circuit is established through the relays. The current flowing through the relay 182 causes the relay to be energized such that the movable contact of the stepping switch 92 becomes advanced from one stationary contact to the next stationary contact of the switch. In this way, the movable contact of the stepping switch 92 becomes advanced in a clockwise direction in FIGURE 9 to the next stationary contact of the switch every time that the movable contact of the stepping switch 90 reaches the last stationary contact of the switch.

The relay 180 becomes energized at the same time as the relay 182. When the relay 180 becomes energized, it acts upon the movable contact of the stepping switch 90 to return the movable contact into engagement with the first stationary contact of the switch. This causes the relay 86 to become de-energized such that the switch 188 becomes opened. By opening the switch 188, the flow of current through the relays 180 and 182 becomes interrupted. At the same time, the switch 122 becomes closed so that a continuous circuit can be established periodically through the relay 114. As previously described, the movable contact of the stepping switch 90 becomes advanced in a clockwise direction in FIGURE 9 to a successive stationary contact of the switch every time that the relay 114 becomes energized.

As previously described, particular stationary contacts of the stepping switch 92 are connected to certain stationary contacts of the stepping switch 90 through the leads 104 and the panel board 94 (FIGURES 2, 8 and 9). For example, the sixth stationary contact of the stepping switch 92 may be connected through one of the leads 104 to the fifth stationary contact of the stepping switch 90. This particular connection is schematically illustrated by one of the leads 104 in FIGURE 2. Because of this particular connection, a continuous circuit is established at the times that the movable contacts of the stepping switches 92 and 90 are respectively engaging the sixth and fifth stationary contacts of the switches. This continuous circuit includes the capcitance 84, the switch 130, the diode 126, the switch 122, the switch 112, the relay 106, the movable and sixth stationary contacts of the stepping switch 92, the particular lead 104 in the panel board 94 and the fifth stationary contact and the movable contact of the stepping switch 90.

The continuous circuit established through the relay 106 causes current to flow through the relay such that the relay becomes energized. When the relay 106 becomes energized, it acts upon the movable contact of the switch 124 to close the switch. By closing the switch 124, a continuous circuit is maintained through the relay 106 even when the switch 122 becomes opened. The switch 105 also becomes closed when the relay 106 becomes energized. This causes the relay 106 to be energized by the flow of current through a circuit including the capacitance 84, the switch 130, the diode 126, the switches 122 and 124 in parallel, the switch 112, the relay 106 and the switch 105. In this way, a holding circuit is established for maintaining the relay 106 energized even after the continuous circuit to ground through the stepping switches 92 and 90 has been interrupted by the advance of the movable contact of the switch 90 to the successive stationary contacts of the switch.

The relay 106 also acts on the movable contact of the switch 150 to close the switch when the relay becomes energized. This causes a continuous circuit to be established which includes the movable contact of the stepping switch 152 and the stationary contact being engaged by the movable contact, the switch 150, the diode 146 and the switch 148. This continuous circuit causes the movable contact and successive stationary contacts of the stepping switch 152 to be grounded.

When the stepping switch 152 is grounded, the ground continues through a circuit including particular ones of the springs 43, racks 40, connectors 46 and whiskers 47. The particular spring 43 and its associated rack 40, connector 46 and whisker 47 is dependent upon which one of the stationary contacts in the stepping switch 152 is being contacted by the movable contact of the switch. This results from the fact that each of the racks 40 is electrically associated with a different one of the stationary contacts in the stepping switch 152.

As described previously, only one of the racks 40 and its associated connector 46 can have a ground potential applied to it at any one time. This ground potential continues through only one of the leads 70 on the commutator 60. The particular lead 70 is that one contacted by the resilient whiskers 47 extending from the grounded rack 40. The particular lead 70 is dependent upon the previous horizontal movement of the grounded rack 40.

Since the different leads 70 on the commutator 60 are connected to different leads in the key punch 72 in FIGURE 1, only one of the leads in the key punch can be grounded at any one time. Each of the leads in the key punch is connected to provide for the punching of a different number when grounded. The numbers are punched on conventional information cards such as those used in equipments manufactured by the International Business Machines Company. A fragmentary portion of one of the information cards is shown schematically in FIGURE 12 and is represented schematically at 250.

As previously described, the different leads 70 on the commutator 60 are connected to different leads in the key punch 72. These different leads are shown in the upper right corner of FIGURE 9 of Von Pein Patent 2,217,209 and are connected to a plurality of magnets, all of which are indicated by the numeral 60. Each of the different magnets 60 in the Von Pein patent controls the punching of a different integer in the card. This is described in the second column on page 4 of the Von Pein specification.

As shown in FIGURE 12, the information card 250 is provided with a plurality of horizontal rows. A vertical column of different numbers formed in part of digits from "0" to "9," inclusive, extends downwardly from each horizontal row on the card 250. When a number is punched on the card, it is represented by a hole in the card. The particular number punched on the card 250 at any instant is dependent upon the particular one of the leads 70 which is grounded in the commutator 60.

After the relay 106 has become energized, it remains energized during the time that the movable contacts of the stepping switches 90 and 152 are advancing in a clockwise direction in FIGURE 9 toward the last stationary contacts of the switches. The relay 106 remains energized during this time because of the formation of a holding circuit through the switch 105. Since the relay 106 remains energized during this time, the switch 150 remains closed. This causes successive racks 40 to become grounded as the movable contact of the stepping switch 152 advances along successive stationary contacts of the switch toward the last stationary contact.

Since successive ones of the racks 40 become grounded, particular leads 70 in the commutator 60 become successively grounded in accordance with the displacements of the racks. This causes different numbers to be punched in sequence in the different horizontal rows of the information card 250 in accordance with the different leads 70 which are sequentially grounded. The various numbers representing the displacements of the successive racks 40 are punched in successive vertical columns of the information card 250.

When the movable contact of the stepping switch 90 reaches the last stationary contact of the switch, a continuous circuit is established through the relay 86 in a manner similar to that described above. This continuous circuit includes the capacitance 84, the relay 86 and the last stationary contact and the movable contact of the stepping switch 90. Current flows through this circuit to energize the relay 86. When the relay 86 becomes energized, it acts upon the movable contact of the switch 112 to open the switch. By opening the switch 112, the continuous circuit through the relay 106 becomes interrupted.

The interruption of the continuous circuit through the relay 106 causes the switch 105 to become opened. This in turn interrupts the holding circuit through the relay 106 and prevents the relay from becoming energized even after the switch 112 has again become closed. The interruption of the current through the relay 106 also causes the switch 150 to become opened. This prevents any ground potential from being established through the stepping switch 152 to the racks 40, the connectors 46, the whiskers 47 and the leads 70 in the commutator 60. Since none of the leads 70 in the commutator 60 can be grounded, a ground potential cannot be introduced to the leads in the key punch to produce a recording of information by the key punch on the card 250.

The time required for the flow of current through the relay 106 to become interrupted is dependent in part upon the resistance value provided by the rheostat 108. This results from the fact that the rheostat 108 and the diode 110 provided a discharge path for dissipating the energy accumulated in the relay 106. The energy is accumulated in the relay 106 because of the inductance in the relay and is accumulated during the flow of current through the relay. By varying the positioning of the movable contact in the rheostat 108, the effective value of the resistance can be correspondingly changed to adjust the time required for producing a discharge of energy in the relay 106. In this way, a proper time can be obtained for the flow of current through the relay 106 to insure the punching of the last number on the card 250. However, the relay 106 is not energized for a sufficiently long time to produce more than one punching of the last number on the card 250.

The switch 124 becomes opened upon the interruption in the flow of current through the relay 106. As previously described, the switch 122 has also become opened because of the flow of current through the relay 86. Since the switches 122 and 124 both become simultaneously opened, the flow of current through a circuit including the capacitance 84, the switch 130, the switch 122 or the switch 124, and the solenoid 68 becomes interrupted. This causes the solenoid 68 to become de-energized and the switch 130 to become opened. By including the diode 136, a path is provided for the discharge of the inductive energy stored in the diode. In this way, the solenoid 68 cannot provide a kick back when the flow of current through the solenoid becomes interrupted.

When the switch 130 becomes opened, the flow of current through a circuit including the capacitance 84, the switch 130 and the solenoid 54 becomes interrupted. By interrupting the flow of current through the solenoid 54, the solenoid becomes de-energized. This causes the cross bar 50 to become released such that the teeth 56 in the cross bar move out of mesh with the teeth 42 in the racks 40. This frees the racks 40 for movement and causes the springs 43 to act on the racks for a return of the racks to their zero position.

The relay 164 also becomes de-energized when the switch 130 becomes opened. This results from the fact that the relay 164 normally becomes energized through a circuit including the capacitance 84, the switch 130, the diode 162 and the relay 164. When the relay 164 becomes de-energized, the carriage in the accounting machine 10 becomes unlocked. This causes the carriage to be moved along the cross bar 23 to the next position on the cross bar.

Upon reaching the next position on the cross bar 23, the arm on the carriage 30 closes one of the switches 31. This initiates a flow of current through the solenoid 68 in a manner similar to that described above. Current is able to flow through this circuit since the switch 122 becomes closed when the movable contact of the stepping switch 90 returns from the last stationary contact to the first stationary contact of the stepping switch.

The switch 130 becomes closed upon the flow of current through the solenoid 68 and causes the solenoid 54 and the relay 164 to become energized in a manner similar to that described above. This in turn produces a locking of the racks 40 by the cross bar 50 and prevents the carriage 30 from being advanced along the cross bar 23 of the accounting machine. In this way, the information in the accounting machine 10 can be transferred to the key punch.

During the operation of the circuitry shown in FIGURE 9 in de-energizing and subsequently energizing the solenoids 54 and 68 and the relay 164, the movable contact of the stepping switch 90 is returning from the last stationary contact to the first stationary contact and then advancing to the second stationary contact. As previously described, no electrical connection is made to the first stationary contact but only to subsequent stationary contacts. In this way, sufficient time is given for the solenoids 54 and 68 and the relay 164 to become de-energized and subsequently energized before the movable contact of the stepping switch 90 reaches the stationary contacts affording information.

The movable contact of the stepping switch 92 advances to the next stationary contact of the switch during the time that the movable contact of the stepping switch 90 is returning to its initial position. This occurs in a manner similar to that described above. For example, the movable contact of the stepping switch 92 may advance from the second to the third stationary contacts of the switch. As the movable contact of the stepping switch 90 then advances along the stationary contacts of the switch, a test is made in a manner similar to that described above as to any cross connections through the leads 104 between the third stationary contact of the stepping switch 92 and all of the stationary contacts in the stepping switch 90. Upon the advance of the stepping switch 90 to a position represented by the cross connection, circuits are completed in a manner similar to that described above for providing a transfer of information from the accounting machine 10 to the key punch.

It will thus be seen that the carriage 30 in the accounting machine 10 moves along the cross bar 23 to successive positions in the machine. At each position, the information represented by a displacement of a particular number of the racks 40 is transferred from the accounting machine 10 to the key punch 72 in FIGURE 1. The particular amount of information transferred at each interruption in the movement of the carriage 30 is dependent upon the cross connections provided between the stationary contacts of the stepping switches 90 and 92. The information transferred upon each interruption in the movement of the carriage 30 represents a "field." The number of positions in which the information is transferred upon each interruption in the movement of the carriage 30 represents the number of "columns" in the "field." For example, six "columns" may be punched in the information card 250 to represent a particular "field" when the relay 106 becomes energized at the fifth of the eleven stationary contacts on the stepping switch 90.

At the beginning of each "field" in the information card "250," an indication of the integer "1" is punched. This indication causes the relay "R30" in the key punch to become energized and the switch 174 associated with the relay to become closed. The switch "R30" appears in schematic drawing 228001P relating to the Type "024" Key Punch manufactured by the International Business Machines Company.

The first column on page 5 of Von Pein Patent 2,217,209 indicates that particular operations are initiated when certain columns are punched in a card. For example, the Von Pein patent indicates that a cut-out of the duplicator is initiated in column 71 of a card by punching a particular indication on the card and that a duplication of data from a master card to an auxiliary card is initiated by punching a particular indication in column 76 of the master card. The particular numerical indication controlling the initiation of a cut-out operation is different from the particular numerical indication controlling the initiation of a duplication operation. This is also shown in FIGURE 2 of the Von Pein patent. For this reason, the beginning of a field can be controlled by providing an indication corresponding to the integer "1" in any desired column to indicate the initiation of a new field. Actually, the indication can also be punched for any integer other than the integer "1" if this should be desired provided that the proper connections are made to the key punch.

When the switch 174 becomes closed, current flows through a circuit including the capacitance 84, the relay 168, the resistance 172 and the switch. The relay 168 becomes energized by the flow of current through this circuit and acts upon the movable contact of the switch 156 to open the switch. This prevents current from flowing through a circuit including the capacitance 84, the switch 156, the resistance 158 and the capacitance 160 in parallel and the relay 164.

Since the relay 164 cannot become energized through this circuit, the mechanisms in the accounting machine 10 for locking the carriage 30 for movement along the cross bar 23 cannot become actuated. In this way, the carriage 30 is able to move along the cross bar 23 in the accounting machine 10 every time that the beginning of a new operational sequence for the punching of information in the card 250 occurs at the beginning of a "field" on the card. This is represented by an indication of "1" on the card in the first column being presented for use.

It may sometimes happen that an improper amount of information may be transferred from the accounting machine 10 to the key punch for recording in the card 250. When an improper amount of information is punched on a card for a particular field, an indication of "1" is not presented in the first column of the next field. For example, a "field" on the card 250 may have a width of five columns before the next indication of "1" to represent the beginning of the next "field." If information is punched in only 4 of the 5 columns in the "field" being presented for use, the indication of "1" representing the beginning of a new "field" will not be initially presented for use after the carriage 30 of the accounting machine 10 has moved to its next position along the cross bar 23. Similarly, an indication of "1" will not be initially presented to represent the beginning of the next field on the card 250 when information is punched in 6 columns in the "field" being presented for use.

As previously described, it may sometimes happen that an indication of "1" is not initially presented on the card 250 to represent the beginning of a new field. When this occurs, the switch 174 included in the key punch cannot become closed. For example, an indication of "1" in a column on the card 250 may be represented by a hole at a particular vertical position in the column. When the indication of "1" does not appear, a finger positioned in the key punch 72 at the particular vertical height cannot pass through the hole to close the switch 174.

Since the switch 174 cannot become closed, current cannot flow in FIGURE 9 through a circuit including the capacitance 84, the relay 168 and the switch. The failure to energize the relay 168 prevents the relay from acting upon the movable contact of the switch 156 to open the switch. By maintaining the switch 156 closed, current is able to flow through a circuit including the capacitance 84, the switch 156, the resistance 158 and the capacitance 160 in parallel and the relay 164. The flow of current through the relay 164 produces an actuation of members for preventing the movement of the carriage 30 along the cross bar 23 in the accounting machine 10. In this way, the accounting machine 10 becomes locked against the transfer of information to the key punch for recording on the information card 250 when the information would be recorded in the wrong positions on the card.

The resistance 158 and the capacitance 160 perform important functions in insuring that the relay 164 becomes properly energized when the switch 156 becomes closed. Since there is initially no charge in the capacitance 160, a large current is able to flow initially through the capacitance and the relay 164 immediately after the switch 156 becomes closed. This initial surge of current insures that the relay 164 becomes quickly energized to lock the carriage 30 against movement along the cross bar 23 in the accounting machine 10. After the initial surge of current through the capacitance 160, the resistance 158 acts to by-pass the capacitance so that a relatively large flow of current through the relay 164 will be maintained.

When the carriage 30 has advanced along the cross bar 23 to the end of the cylinder, the arm 35 on the carriage engages the movable contact of the switch 36. The arm 35 actuates the movable contact of the switch 36 from engagement with the left stationary contact of the switch in FIGURE 9 into engagement with the right stationary contact of the switch. This causes a continuous circuit to be established which includes the capacitance 84, the relay 180, the relay 190, the diode 194, the right stationary and movable contacts of the switch 36, the switch 186 and the switch 188.

The circuits through the relays 180 and 190 can be established only when the switches 186 and 188 are closed. The switch 188 becomes closed during the time that the relay 86 is being energized. As previously described, the relay 86 becomes energized when the movable contact of the stepping switch 90 engages the last stationary contact of the switch. The switch 186 becomes closed during the time that the relay 106 is not being energized. It has been previously described that the relay 106 becomes de-energized when the movable contact of the stepping switch 90 engages the last stationary contact of the switch. In this way, a continuous circuit is established through the relays 180 and 190 when the carriage 30 has completed its movements along the crossbar 23 in the accounting machine 10 and the movable contact of the stepping switch 90 has reached the last stationary contact of the switch.

The flow of current through the relay 180 causes the movable contact of the switch 90 to be returned into engagement with the first stationary contact of the switch. In like manner, the flow of current through the relay 190 causes the movable contact of the stepping switch 92 to return into engagement with the first contact of the switch. By returning the movable contacts of the stepping switches 90 and 92 into engagement with the first stationary contacts of the switches, the coupler constituting this invention is placed into condition for providing a new interchange of information from the accounting machine 10 to the key punch. This information would be recorded by the key punch on the next card introduced to the key punch.

It may sometimes happen that incorrect information is recorded on a card. For example, an indication of "1" to represent the beginning of a new field may not sometimes be presented at the initiation of a new operation. Since the information being recorded is incorrect, it may be desired to initiate a new operation. This is accomplished by manually closing the switch 196. When the switch 196 is closed, a continuous circuit is established which includes certain components in the key punch, the diode 202, the capacitance 200 and the resistance 198 in parallel and the switch 196. The flow of current through this circuit causes the card 250 in the key punch to be ejected and a new card to be inserted for the recording of information on the card.

The closure of the switch 196 also causes a continuous circuit to be established which includes the capacitance 84, the relay 180, the relay 190 and the switch. Because of the flow of current through the relays 180 and 190, the movable contacts of the stepping switches 90 and 92 are returned to the first stationary contacts of the switches so that a new operation can be initiated. In this way, a check is provided to insure that information is properly recorded on the cards 250.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for providing a coded recording of signal information on at least one card having a plurality of fields and a plurality of columns in each field in accordance with signal information from control apparatus, a first sequentially operated switch for indicating the particular field in the plurality being made available for operation, a second sequentially operated switch for indicating in the particular field the particular column being made available for operation, means for providing a control over the particular number of columns to be chosen in each field, means coupled to the control apparatus for providing indications as to the values in the different columns, and means including the first and second switches and the control means for obtaining the passage of signal indications for the recording of indications on each card as to the numerical values for the columns chosen in each field in accordance with the signal information from the control apparatus.

2. In combination for providing a coded recording of signal information on at least one card having a plurality of fields and a plurality of columns in each field in accordance with signal information from control apparatus, a first sequentially operated switch for indicating the particular column being made available for use, means including a second sequentially operated switch for advancing the second switch upon each indication of a particular count by the first switch to provide an indication of the particular field being made available for computation, means for controlling in each field the position on the first switch at which the columns are made available for activation, electrical circuitry including a relay for obtaining an energizing of the relay upon the activation of the columns in the field undergoing computation, and electrical circuitry including the relay for obtaining an establishing of electrical continuity to provide a passage of the signal information for a recording of the signal information in the card.

3. In combination for providing a coded recording of signal information on at least one card having a plurality of fields and a plurality of columns in each field in accordance with information from control apparatus, a first sequentially operated switch for indicating the particular field in the plurality being made available for computation, a second sequentially operated switch for indicating in the particular field the particular column in the plurality being made available for computation, means for providing signal indications controlling the particular number of columns to be made available for operation in each field, a third sequentially operated switch coupled to the second switch, means including the first and second switches and the control means for obtaining a sequential activation of the third switch after the particular column has been made available for operation in the field undergoing computation, a plurality of racks each coupled to the control apparatus for positioning in accordance with the information from the control apparatus, and means including the racks for obtaining the passage of signal information upon the activation of the third switch and in accordance with the disposition of the racks for the recording of the signal information on the card.

4. In combination for providing a coded recording of signal information on at least one card having a plurality of fields and a plurality of columns in each field in accordance with signal information from control apparatus, first sequentially operated switching means for controlling the particular column being activated at any instant, means including second sequentially operated switching means associated with the first switching means for controlling the particular field being activated at any instant and for providing an advancement in indication of the second switching means upon each occurrence of a particular count in the first switching means, a commutator having a plurality of conductive leads, means including a plurality of racks coupled to the control apparatus for movable disposition in accordance with the signal information from the control apparatus and associated with the commutator to obtain the passage through the commutator of electrical indications as to the disposition of the racks, and means for controlling in each field the first particular column to be activated and for obtaining the passage of the electrical indications from the commutator in the columns after the first particular column for a recording on the card of the signal information.

5. In combination for providing a coded recording of signal information on at least one card having a plurality of fields and a plurality of columns in each field in accordance with signal information from control apparatus, means for controlling the particular fields and the particular columns in each field to be activated, first means for sequentially obtaining a presentation of the columns, second means associated with the first means for sequentially obtaining a presentation of the fields upon each occurrence of a particular count by the first sequential means, means including a plurality of racks coupled to the control apparatus for obtaining a movable disposition of the racks in accordance with the information from the control apparatus and for obtaining a fixed disposition of the racks after their movement, means including a commutator for obtaining a conversion of the disposition of the racks into signal indications representing the disposition of the racks in electrical form, and means associated with the control means and the first and second sequential means and the commutator for obtaining the passage of the signal information from the commutator upon the presentation of the columns in a paricular field for a recording on the card of information corresponding to the signal information.

6. In combination for providing a coded recording of signal information on at least one card having a plurality of fields and a plurality of columns in each field in accordance with signal information from control apparatus, a first sequentially operated switch for indicating the particular column being presented for operation at any instant, means including a second sequentially operated switch associated with the first sequentially operated switch to become advanced upon each occurrence of a particular indication by the first switch for an indication of the field being presented for operation at any instant, means including a relay connected in a circuit with the first and second switches to become energized upon the occurrence of a particular column in the field being presented for operation and during the remainder of the field, means including a commutator for providing signal indications in accordance with the information from the control apparatus, and means including the relay and the commutator for providing a continuous circuit for a recording on the card of the signal information from the commutator during the time that the relay is being energized.

7. In combination for providing a coded recording of signal information on at least one card having a plurality of fields and a plurality of columns in each field in accordance with signal information from control apparatus, a plurality of racks coupled to the control apparatus for movement into different positions in accordance with the signal information from the control apparatus, a commutator having a plurality of lines for indicating different information and disposed for coupling to the racks to activate the lines in accordance with the disposition of the racks, means including first activating means operatively coupled to the commutator for producing a relative movement between the racks and the commutator to provide a coupled relationship between these members to energize particular lines in the commutator in accordance with the positions of the racks, means including second activating means operatively coupled to the racks for obtaining a fixed positioning of the racks until the recording of the information represented by the disposition of the racks, means for sequentially presenting the columns for operation and, upon each occurrence of a particular value for the columns, for sequentially presenting the fields for operation, means adjustable to different settings and associated with the sequentially presenting means for obtaining the production of control signals upon the sequential presentation of particular columns and particular fields and in accordance with the settings of the adjustable means, and means including the second actuating means for obtaining the passage of the information in the activated lines of the commutator upon the occurrence of the control signal and during the presentation of the remaining columns in the field being presented for operation for the transfer of the information to the card.

8. In combination for providing a coded recording of signal information on at least one card having a plurality of fields and a plurality of columns in each field in accordance with signal information from control apparatus, means for obtaining a sequential presentation of each field and particular columns in the field for the transfer of signal information in those columns for recording, means for providing an adjustable control over the number of columns to be activated in each field, means responsive to signal information from the control apparatus for storing such signal information, means for obtaining the passage for recording of the signal information from the storing means in the activated columns of each field, and means responsive to the recording of information in the different columns for each field for obtaining the advance of the card to the next field for the recording of information in the different columns of that field.

9. The combination set forth in claim 8 in which the adjustable control means include a control panel having a first plurality of positions representing the fields and a second plurality of positions representing the columns and in which leads extend between the different positions in the first plurality and the different positions in the second plurality in accordance with the number of columns to be activated in each field.

10. In combination for providing a coded recording of signal information on at least one card having a plurality of fields and a plurality of columns in each field in accordance with signal information from control apparatus, means for obtaining a sequential presentation of each field and each column in the field for the transfer of signal information for recording, means including a plurality of racks coupled to the control apparatus for movement simultaneously into positions representative of the signal information from the control apparatus and for obtaining the fixed positioning of the racks until the recording of the signal information, means including a commutator for obtaining a transducing action between the positioning of the racks and the passage of the signal information for recording upon the activation of the columns in each field, means for providing an adjustable control over the number of columns to be activated in each field for the passage of the signal information for recording, and means responsive to the recording of information in the different columns of each field and responsive to the disposition of the card at the end of a field after such recording for obtaining an advance of the card to the next field for recording.

11. In combination for providing a coded recording of signal information on at least one card having a plurality of fields and a plurality of columns in each field in accordance with signal information from control apparatus, there being on the card indications representing the beginning of each field, means for providing for a storage of information from the control apparatus, means for obtaining a sequential presentation of the fields and the columns in each field for the transfer of the stored information for recording, means for obtaining the activation of a particular number of columns in each field to obtain a transfer of the stored information in the activated columns, means for producing signals for an advancement of the card upon each presentation of an activated column, and means for obtaining an indication of the absence of the beginning of each field in the card upon the completion of the presentation of the activated columns in the previous field to represent an error in the recording of the information on the card.

12. In combination for providing a coded recording of signal information on at least one card having a plurality of fields and a plurality of columns in each field in accordance with signal information from control apparatus, there being on the card indications representing the beginning of each field, means coupled to the control apparatus to obtain a storage of information from the control apparatus, means for obtaining for a sequential presentation of the different fields and the different columns in each field, means for obtaining an activation of a particular number of columns in each field during the presentation of the columns, means for obtaining a passage of the stored information for a transfer of the stored information to the card for recording on the card during the activation of the particular columns in each field and for an advance of the card during the transfer of the stored information, and means for preventing any passage of the stored information for transfer of the information to the card upon an advance of the card to a position different from the beginning of the next field in the card upon the completion of the passage of the stored information in the field being presented for use.

13. In combination for providing a coded recording of signal information on at least one card having a plurality of fields and a plurality of columns in each field in accordance with signal information from control apparatus, there being indications on the card to represent the beginning of each field, means for obtaining a sequential presentation of each field and each column in the field for the transfer of signal information for recording, means for providing an adjustable control over the number of columns to be activated in each field, means for obtaining a reception of the signal information from the control apparatus for storage, means for obtaining the transfer for recording of the stored signal information only in the activated columns of each field, and means for obtaining the production of signals controlling an advance of the card during the transfer of the stored signal information in the activated fields and for preventing any further passage of information for the transfer of information to the card upon the advance of a card to a position other than the beginning of each field at the completion of the transfer of the signal information in the activated columns of the previous field.

14. In combination for use with an information card having a plurality of columns and for use with control apparatus for processing data to provide information relating to a plurality of fields on a sequential basis and relating to a plurality of columns in each field and for use with means for recording information on the cards, means for sequentially presenting each field and only particular columns in the field for the transfer of signal information from the control apparatus, means including a plurality of members coupled to the control apparatus for movement into positions representative of the signal information from the control apparatus for the different columns in the presented field, means operative upon a proper positioning of the members in the plurality to retain the members in fixed positioning until the recording on the card of signal information representing the positioning of the members, means including a commutator having a plurality of lines for providing a transducing action between the positioning of the members and the passage of signal information through the lines in the commutator in accordance with the sequential activation of the columns in the presented field, means responsive to the signal information on the different lines in the commutator and operatively coupled to the recording means for obtaining a recording of information in the successive columns on the card in accordance with the passage of the signal information through the different lines in the commutator upon the sequential activation of the columns, and means responsive to the recording of information in the different columns for each field and responsive to the disposition of the card at the end of a field after such recording for obtaining an advance of the card to the next field for the recording of information in the different columns of the next field.

15. In combination for use with an information card having a plurality of columns and for use with control apparatus for processing data to provide information relating to a plurality of fields on a sequential basis and relating to a plurality of columns in each field and for use with means for recording information on the card, a plurality of racks coupled to the control apparatus for movement into different positions in accordance with the signal information from the control apparatus to represent the information for the different columns in the presented field, a commutator having a plurality of lines for indicating different information and disposed for coupling to the racks to energize the lines in accordance with the disposition of the racks, means including relay means for obtaining a locking of the racks upon their movement into positions related to the signal information from the control apparatus and for obtaining a relative movement between the racks and the commutator to produce a coupled relationship between these members during the locking of the racks, means for sequentially presenting the fields for operation and for sequentially presenting particular columns in each field during the presentation of the field, means for energizing different lines in the commutator in accordance with the disposition of the racks and upon the sequential presentation of the different columns, means for activating the recording means in accordance with the energizing of the different lines to obtain the recording of the information on the card, means responsive to the recording of information in each column on the card for obtaining an advance of the card to the next column, and means responsive to the recording of information in all of the columns in each field for obtaining an advance of the card to the next field for the recording of information in the different columns of the next field.

16. In combination for use with an information card having a plurality of columns and for use with control apparatus for processing data to provide information relating to a plurality of fields on a sequential basis and relating to a plurality of columns in each field and for use with means for recording information on the cards, a plurality of racks coupled to the control apparatus for movement into different positions in acccordance with the signal information from the control apparatus, a commutator having a plurality of lines for indicating different information and disposed for coupling to the racks to activate the lines in accordance with the disposition of the racks, means including first actuating means coupled to the commutator for providing a relative movement between the racks and the commutator to provide a coupled relationship between these members for an energizing of particular lines in the commutator in accordance with the positions of the racks, means including second actuating means coupled to the racks for maintaining the racks in fixed positioning until the recording of information represented by the disposition of the racks, means for sequentially presenting the fields and particular columns in the fields for operation, means including the second actuating means and coupled to the control apparatus for preventing any adjustment of the information from the control apparatus during the energizing of particular lines in the commutator in accordance with the positions of the racks, means for obtaining the energizing of different lines in the commutator in accordance with the setting of the racks and upon the sequential activation of the columns in the field being presented for operation, means operatively coupled to the recording means for obtaining a recording on the card of the information represented by the energized lines of the commutator and for advancing the card to the next column after the recording of information in each column, and means responsive to the recording of information in the different columns of each field and responsive to the disposition of the card at the end of a field after such recording for obtaining an advance of the card to the next field for the recording of information in the different columns of that field.

17. In combination for use with an information card having a plurality of columns and for use with means for recording on the card information relating to a plurality of fields and a plurality of columns in each field and for use with an accounting machine constructed to perform arithmetic operations on a digital basis and to provide output indications as to the digital results of such arithmetic operations, control means for indicating a plurality of successive fields and for indicating the number of columns to be activated in each of the successive fields in the plurality, means including a plurality of movable means coupled to the accounting machine to become positioned in accordance with the digital output indications from the accounting machine, the control means being coupled to the movable means to control the positioning of the movable means in accordance with the particular field activated in the plurality at any instant and in accordance with the number of activated columns in the particular field, means responsive to the disposition of the movable means in the plurality in accordance with the information from the accounting machine and coupled to the recording means to obtain the recording on the card of information related to the disposition of the movable means, and means responsive to the recording on the card of the information for the different columns in each particular field in the plurality to obtain an activation of the next field in the plurality for the recording on the card of information relating to the next particular field.

18. In combination for use with an information card having a plurality of columns and for use with means for recording on the card information relating to a plurality of fields and a plurality of columns in each field and for use with an accounting machine constructed to perform arithmetic operations on a digital basis and to provide output indications as to the digital results of such arithmetic operations, control means for indicating a plurality of successive fields and for indicating the number of columns to be activated in each of the successive fields in the plurality, a plurality of movable means coupled to the accounting machine to become positioned in accordance with the digital results of the arithmetic operations by the accounting machine, the movable means in the plurality also being coupled to the control means to become positioned in accordance with the particular field being activated in the plurality at any instant and in accordance with the number of columns to be activated in the particular field at that instant, and means coupled to the movable means for obtaining a recording of indications in successive columns on the card in accordance with the positioning of the different movable means in the plurality.

19. In combination for use with an information card having a plurality of columns and for use with recording means constructed to record information in digital form sequentially in the different columns of the information card and for use with an accounting machine constructed to process input information introduced into the accounting machine and to process such input information for the production in digital form of output information related to the input information, control means for indicating a plurality of fields and for indicating a number of columns to be activated in each field in the plurality where the number of activated columns in each field in the plurality may be different from the number of activated columns in the other fields in the plurality, a plurality of actuatable means coupled to the accounting machine for actuation in accordance with the output information digitally provided by the accounting machine, means responsive to the control means to obtain the activation of each particular field in the plurality and to obtain the sequential activation of successive columns in the particular field, and means responsive to the sequential activation of the successive columns in each particular field and coupled to the actuatable means in the plurality for obtaining the recording of information in successive columns on the card in accordance with the actuation of the actuatable means for that particular field.

20. In combination for use with an information card having a plurality of columns and for use with recording means constructed to record information in digital form sequentially in the different columns of the information card and for use with an accounting machine constructed to process input information introduced into the accounting machine and to process such input information for the production in digital form of output information related to the input information, control means for indicating a plurality of fields and for indicating a number of columns to be activated in each field in the plurality where the number of activated columns in each field in the plurality may be different from the number of activated columns in the other fields in the plurality, a plurality of actuatable means coupled to the accounting machine for disposition in accordance with the output indications from the accounting machine, activating means coupled to the control means for obtaining a sequential activation of each particular field in the plurality and for obtaining a sequential activation of the successive columns in each particular field upon the activation of that particular field, means coupled to the activating means and to the actuatable means and to the recording means for obtaining a recording of information in each successive column on the card upon an activation of each successive column in the activated field in the plurality and in accordance with the disposition of the particular actuatable means in the plurality to represent that column, and means responsive to the recording of information in each column in the card for the activated field in the plurality to obtain an advance of the card to a position for recording information in the next column on the card.

21. In combination for use with recording means for recording on a card information in a plurality of fields and in a plurality of columns in each field and for use with an accounting machine constructed to perform arithmetic operations on a digital basis and to produce output indications as to the digital results of such arithmetic operations, control means for indicating a plurality of fields and for indicating a plurality of columns in each field where the number of columns in each field may be different from the number of columns in the other fields in the plurality, a plurality of actuatable means disposed for coupling to the accounting machine to become positioned in accordance with the output indications from the accounting machine in representation of the values of the different digits in each field, means responsive to the positioning of the actuatable means for the different columns in each particular field for obtaining an introduction to the recording means of signals indicative of the positioning of individual actuatable means in the plurality, and means responsive to the recording of indications on the card for each successive column in each particular field to obtain an advance of the card to the next column in that particular field.

22. In combination for use with recording means for recording on a card information in a plurality of fields and in a plurality of columns in each field and for use with an accounting machine constructed to perform arithmetic operations on a digital basis and to produce output indications as to the digital results of such arithmetic operations, control means for indicating a plurality of fields and the number of columns to be activated in each field in the plurality where the number of columns to be activated in each field in the plurality may be different from the number of columns to be activated in the other fields in the plurality, a plurality of actuatable means disposed for coupling to the accounting machine for disposition in accordance with the output indications from the accounting machine, means responsive to the positioning of the actuatable means in accordance with the indications from the accounting machine and responsive to the control means for activating successive actuatable means in the plurality in accordance with the number of columns to be activated in the particular field in the plurality, means responsive to the activation of each actuatable means in the plurality for obtaining an introduction to the recording means of signals representing the disposition of the activated actuatable means, and means responsive to the recording of indications on the card for each successive column in each particular field to obtain an advance of the card to the next column in that particular field.

23. The combination set forth in claim 22 in which means are coupled to the actuatable means in the plurality to obtain a release of the actuatable means upon the recording on the different columns of the card for the particular field of information corresponding to the disposition of the actuatable means in the plurality.

24. In combination for use with a card having a plurality of fields and a plurality of columns in each field and for use with recording means for recording on the card information in a plurality of fields and in a plurality of columns in each field and for use with an accounting machine constructed to perform arithmetic operations on a digital basis and to produce output indications on a plurality of movable members in the accounting machine as to the digital results of such arithmetic operations, control means for indicating a plurality of fields and a number of columns to be activated in each field in the plurality where the number of columns to be activated in each field in the plurality may be different from the number of columns to be activated in the other fields in the plurality, a plurality of actuatable means each disposed for coupling to a different one of the movable members in the accounting machine and each actuatable to a different position in accordance with the disposition of the coupled movable member, means coupled to the actuatable means in the plurality for retaining the actuatable means in position upon the actuation of the actuatable means by the movable members in the accounting machine, means responsive to the positioning of the actuatable means in the plurality by the movable members in the accounting machine for activating successive columns in the particular field in the plurality having information recorded, means responsive to the activation of each successive column in the particular field in the plurality for obtaining the introduction of signals to the recording means in representation of the disposition of the actuatable means in the plurality corresponding to such column, means responsive to the recording of information in the recording means for each column in the particular field on the card for obtaining an advance of the card to the next column for the recording of information in the next column, means responsive to the recording of information on the card for the different columns of the particular field to obtain a release of the actuatable means in the plurality, and means responsive to the recording of information on the cards in the different columns of the particular field to prevent the recording of information in the next particular field in the plurality upon the disposition of the card at a position other than the beginning of he next field in the plurality.

25. In combination for use with an information card having a plurality of columns and for use with means for recording on the card information relating to a plurality of fields and a plurality of columns in each field and for use with data processing means for processing data and for providing signal indications representing processed data in coded form for the different columns in a field, means for obtaining a sequential presentation of each field and particular columns in the field for the transfer of signal information from the data processing means to the recording means for recording, means coupled to the data processing means for obtaining the reception of signal information from the data processing means for storage, means coupled to the recording means and responsive to the signal information from the receiving means for providing for the passage from the receiving means to the recording means of the signal information in the activated columns of each field, and means responsive to the recording of information in the different columns for each field for obtaining an advance of the card to the next field for the recording of information in the different columns of the next field.

References Cited in the file of this patent

UNITED STATES PATENTS

| 1,780,610 | Weinlich | Nov. 4, 1930 |
| 2,217,209 | Von Pein et al. | Oct. 8, 1940 |
| 2,285,353 | Peirce | June 2, 1942 |
| 2,684,719 | Johnson et al. | July 27, 1954 |
| 2,756,823 | Laville et al. | July 31, 1956 |

UNITED STATES PATENT OFFICE
CERTIFICATE OF CORRECTION

Patent No. 3,017,074              January 16, 1962

Glenn E. Hagen

It is hereby certified that error appears in the above numbered patent requiring correction and that the said Letters Patent should read as corrected below.

Column 21, line 9, for "activating" read -- actuating --; column 25, line 35, for "fiield" read -- field --; column 27, line 6, for "he" read -- the --.

Signed and sealed this 27th day of November 1962.

(SEAL)
Attest:
ESTON G. JOHNSON
Attesting Officer

DAVID L. LADD
Commissioner of Patents